United States Patent [19]

Oka

[11] Patent Number: 4,544,391

[45] Date of Patent: Oct. 1, 1985

[54] METHOD FOR SEPARATION OF SOLID MIXTURES BY SIMULTANEOUS MULTI-STAGE RECRYSTALLIZATION

[75] Inventor: Hiroshi Oka, Kawasaki, Japan

[73] Assignee: Kohjin Co., Ltd., Tokyo, Japan

[21] Appl. No.: 434,513

[22] Filed: Oct. 15, 1982

[51] Int. Cl.$^4$ .............................................. B01D 9/02
[52] U.S. Cl. ...................................... 62/541; 23/297; 62/544
[58] Field of Search .......................... 23/300, 299, 297; 260/707; 422/245, 254, 258, 260, 275; 544/276; 62/541, 544

[56] References Cited

U.S. PATENT DOCUMENTS

| | | | |
|---|---|---|---|
| 3,393,055 | 7/1968 | Stevenson | 23/300 |
| 3,607,392 | 9/1971 | Laver | 62/544 |
| 3,621,664 | 11/1971 | Saxer | 62/544 |

FOREIGN PATENT DOCUMENTS 1229022  4/1971  United Kingdom .

OTHER PUBLICATIONS

Hlullin, Crystallization, CRC Press Cleveland, Ohio, 1972, pp. 233-234.

*Primary Examiner*—Hiram H. Bernstein
*Attorney, Agent, or Firm*—Armstrong, Nikaido, Marmelstein & Kubovcik

[57] ABSTRACT

A method for separating a desired component from a solid mixture by repeated recrystallization in a single vertical crystallizer having a plurality of chambers partitioned by solid-liquid separation means, which comprises intermittently feeding a solid mixture to the top chamber and a solvent to the bottom chamber, dissolving the solid in each chamber in the solvent by heating after feeding of the solid mixture to the top chamber, transferring the resulting solution in each chamber to the adjacent lower chamber while taking out from the bottom chamber the solution from which the desired component is recovered as an end product, cooling the solution in each chamber to precipitate crystals, and transferring the resulting mother liquor in each chamber upwardly through the separation means not capable of passing the resulting crystals by the feeding of the solvent to the bottom chamber, while allowing excess mother liquor to overflow from the top of the crystallizer, the above procedures being repeated continuously. The crystallizer suitable for practicing the method is composed of a tower having a feed port for feeding the solid mixture and a discharge port for overflow of the excess mother liquor in the upper end portion, a feed port for feeding the solvent and a discharge port for taking out the solution in the lower end portion, separtion means for separating solid and liquid by which the tower is divided into chambers, and means for heating and cooling the content in the tower.

5 Claims, 2 Drawing Figures

4,544,391

METHOD FOR SEPARATION OF SOLID MIXTURES BY SIMULTANEOUS MULTI-STAGE RECRYSTALLIZATION

BACKGROUND OF THE INVENTION

The present invention relates to a method for separating a substance by recrystallization, and more particularly to a method for separating a desired substance from a solid mixture by repeated recrystallization and an apparatus suitable for use in practicing the method.

Separation and purification of a substance by crystallization have been widely conducted in the chemical industry. Particularly, crystallization is an effective separation means for a substance to which a separation means utilizing vapor-liquid equilibrium such as distillation is hard to apply due to its small vapor pressure. However, there are often cases in which no sufficient separation is made by conducting crystallization one time. In such cases, a method in which recrystallization is repeated is commonly used in laboratories to obtain a desired substance having a desired purity, but this method is hard to adapt industrially due to low yield of separation.

The yield can be improved by utilizing a filtrate obtained in recrystallization for a substance having a higher purity as a solvent for crystallization of the substance having a lower purity in a prior stage, and a multi-stage separation and crystallization method based on this idea is proposed. The principle of the multi-stage separation and crystallization method is well known, and may be represented by the diagram in FIG. 1 in which:

1 to n: Number of the recrystallization stage
Z: Raw material
C: Crystals
M: Solute in recrystallization filtrate
L: Solvent In this method, however, solid and liquid phases are handled, and this complicates the procedure and prevents the method from being industrially utilized.

As a method which does not require the procedure of separating solid and liquid phases, there is proposed a multi-stage separation and crystallization method in which crystals are deposited on the wall of a crystallization tower serving as a crystallizer and the mother liquor of crystallization is employed as a solvent for crystallization in another crystallizer of the prior stage, as disclosed in Japanese Examined Patent Publication (Tokkyo Kokoku) No. 41637/1978. However, this method has drawbacks in that the efficiency is low and the work is complicated, because it is a complete batch system using a single crystallizer in each stage.

Accordingly, it is an object of the present invention to provide a method for separting a desired substance in high yields by multi-stage recrystallization which can be efficiently conducted in a simple manner.

A further object of the invention is to provide a method for separation or purification by recrystallization which is conducted in a continuous and repeated mode in a single crystallizer.

Another object of the invention is to provide a crystallizer which is simple in structure and is suitable for practicing the method of the invention.

These and other objects of the present invention will become apparent from the description hereinafter.

SUMMARY OF THE INVENTION

In accordance with the present invention, there is provided a method for separating a substance from a mixture of solid substances which comprises intermittently and countercurrently feeding a raw material in the form of a mixture of solid substances from one end portion of a plate tower and a solvent from the other end portion of the plate tower, said plate tower being divided into chambers by separation plates for separating a precipitate and a liquid, conducting a multi-stage recrystallization in a synchronized manner with the intermittent feeding in a cycle consisting of heating the solvent in each chamber to dissolve the solid substances, transferring the resulting solution in each chamber to the adjacent next chamber, cooling the solution to precipitate a desired substance and transferring the resulting mother liquor in each chamber to the adjacent prior chamber, and taking out the desired substance with the solvent from the chamber positioned on the solvent feeding side and taking out undesired substances with the solvent from the chamber positioned on the raw material feeding side.

The present invention also provides an apparatus for multi-stage recrystallization comprising a tower having a feed port for feeding a raw material containing the first and second components and a discharge port for discharging a liquor containing the second component in one end portion, a feed port for feeding a solvent and a discharge port for discharging a liquor containing the first component in the other end portion, a plurality of porous separation plates capable of passing a liquid, but not capable of passing crystals, said porous separation plates being provided to divide the tower into chambers arranged in series, and means for heating and cooling the content in the tower.

The process of the present invention has the advantage that a desired substance is isolated by a simple procedure with a high separation efficiency and a good workability. The process of the invention is also excellent as a separation method utilizing solubility equilibrium corresponding to a rectification procedure utilizing gas-liquid equilibrium in that optimum operating conditions can be selected by suitably selecting the feed amount of a solvent and the number of stages. Also, the apparatus of the invention is simple in structure and operation and is excellent in terms of cost of equipment, maintenance and working procedure, and accordingly is of great value in industrial practice.

DETAILED DESCRIPTION

The process of the present invention is carried out by employing a plate tower having heating and cooling means and chambers partitioned by separation plates for separating a solid and a liquid. A solid raw material which is a substance containing impurities or a mixture of a substance to be isolated and a substance to be removed, is intermittently fed from the upper end portion of the plate tower, and a solvent is intermittently fed from the lower end portion of the plate tower. The dissolution of the solids by heating and the crystallization by cooling are repeated according to the cycle of the intermittent feeding of the raw material and the solvent, thus countercurrently repeating recrystallization, while the resulting mother liquor in each chamber is reused by the transfer to the adjacent upper chamber. A desired substance to be recovered is taken out with the solvent as a solvent solution from the lower end portion of the plate tower, and an undesired substance to be removed is taken out with the solvent as a solvent solution from the upper end portion of the plate tower. The separation plates are made of a porous material. In the heating period, the plates allow the resulting solution of solid substances to pass therethrough, and in the cooling period the plates allow the resulting mother liquor to pass therethrough, but do not allow the resulting crystals to pass. The plate tower is provided with heating and cooling means. A plurality of heating means and cooling means may be provided in the respective chambers, or a single heating and cooling means, e.g. a jacket through which a heating medium is passed in the heating period and a cooling medium is passed in the cooling period, may be provided to the plate tower.

Figure 1:
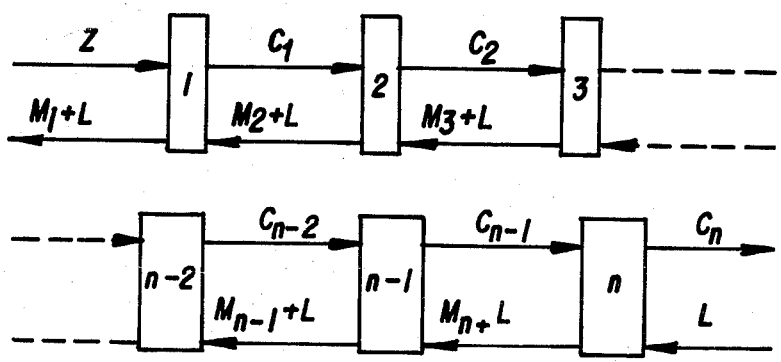
FIG. 1 is a schematic diagram of multi-stage recrystallization.
Figure 2:
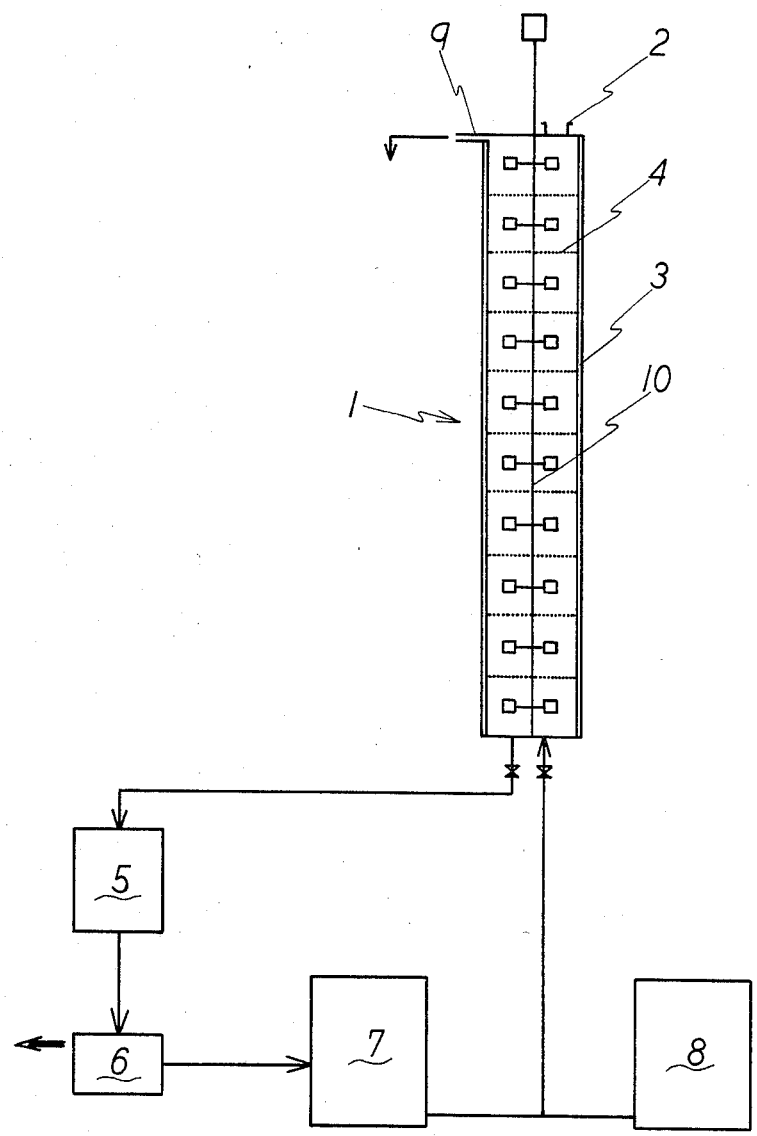
FIG. 2 is a schematic view showing an embodiment of a multi-stage recrystallization apparatus of the present invention.

The process and the multi-stage crystallizer of the present invention will be explained by reference to FIG. 2. A crystallizer of 10 stages is illustrated as one embodiment of the invention, but the following explanation is of course applicable to crystallizers of any stages. The operation is explained with respect to operation under normal conditions wherein the composition in the tower is in a steady state.

With the multi-stage recrystallization tower 1 being filled with a solvent or solvent solution, a solid raw material is fed to the top chamber from a feed port 2 for feeding the raw material, in an amount that the solvent included in the top chamber can dissolve. A heating medium is then passed through a heat exchanger 3 for heating and cooling the content of the tower, to heat and dissolve the solids. The resulting solution in the chamber of each stage is hardly mixed with the solution in the adjacent chambers, since the chambers are partitioned by separation means 4 for separating solid and liquid, e.g. by a filter medium such as filter cloth. When the solids have dissolved in the solvent, the solution in each chamber is transferred downward to the adjacent lower chamber, while the solution in the bottom chamber is transferred to a final crystallization tank 5 from a discharge port for taking out the solution in which a desired component to be isolated or purified by repeated recrystallization is dissolved.

A cooling medium is then passed through the heat exchanger 3 to cool and precipitate crystals. The solution transferred to the final crystallization tank 5 is also cooled to produce crystals as an end product. It is not necessary to carry out the final crystallization in the tank 5 in concert with the dissolution and crystallization cycle in the tower. The solution transferred from the tower may be accumulated in the tank 5 and subjected to crystallization in a lump. The end product is separated from the mother liquor by a separator 6 and is removed. The separated mother liquor is stored in a final mother liquor tank 7.

After the crystallization by cooling, an amount of the mother liquor sufficient for one chamber and a suitable amount of fresh solvent are fed from the final mother liquor tank 7 and a fresh solvent tank 8 to the bottom chamber through a feed port for feeding solvent positioned in the lower end portion of the tower 1. By the feeding of the mother liquor, i.e. used solvent, and the fresh solvent, the mother liquor in the tower 1 transfers upwardly by an amount corresponding to the fed liquid, namely by an amount corresponding to the total volume of one chamber and the additional fresh solvent, while the crystals deposited in each chamber are kept therein by the presence of the solid-liquid separation means 4. On the other hand, the mother liquor in the top chamber overflows through a discharge port 9 in an amount corresponding to the additional fresh solvent. This overflowing liquor contains a substance to be removed from the raw material.

The separating operation of one cycle is attained in this manner. The separation is continued by repeating the above operation. The raw material fed to the top chamber is transferred successively from an upper chamber to the adjacent lower chamber, finally to the bottom chamber, while repeating the recrystallization, thus causing the desired component to separate.

An agitator 10 is not necessary, but it is preferably provided in the tower 1 to raise the efficiency of heat exchange for heating and cooling at the time of the dissolution and crystallization.

The fed solvent may be a fresh solvent alone or a mixture of the used solvent and a fresh solvent. Preferably, the solvent is fed in an amount larger than the volume of one chamber so that the solution containing undesired substances to be removed is taken out from the top portion of the tower.

The present invention is applicable to a very wide range of fields, e.g. purification of various chemical substances and resolution by crystallization of optically active diastereomers.

The present invention is more specifically described and explained by means of the following Example. It is to be understood that the present invention is not limited to the Example and various changes and modifications may be made in the invention without departing from the spirit and scope thereof.

EXAMPLE 1

To an eight-stage crystallizer, the volume of one chamber on each stage being 100 ml., were fed 15 g./cycle of chemically synthesized crude guanine (purity 97%, whiteness 70) as a raw material and 100 ml./cycle of a 20% by weight aqueous solution of sodium hydroxide as a solvent from the top and the bottom of the crystallizer, respectively. After dissolving guanine in the solvent at 70° C., the resulting solution in the crystallizer was transferred downwardly by 100 ml. At the same time, the solution in the 8th bottom chamber is transferred to a tank. The solution in the crystallizer and the tank was then cooled at 15° C. to precipitate guanine, and the mother liquor in the crystallizer was transferred upwardly by feeding 100 ml. of the aqueous solution of sodium hydroxide from the bottom of the crystallizer.

The sodium metal salt of guanine precipitated in the tank was taken out and neutralized with an acid to give purified guanine having a purity of not less than 99.5% and a whiteness of not less than 90. The yield was 94%.

In addition to the elements or ingredients used in the Example, other elements or ingredients can be used in the Example as set forth in the specification to give substantially the same results.

What is claimed is:
1. A method for separating a substance from a mixture of solid substances which comprises: (1) intermittently and countercurrently feeding both (i) a raw mate- rial in the form of a mixture of solid substances to one end portion of a plate tower and (ii) a solvent to the other end portion of the plate tower, said plate tower being divided into chambers by separation plates suitable for separating a precipitate from a liquid, (2) conducting a continuous multi-stage recrystallization after each of said feeding, said multi-stage recrystallization consisting of the following sequence of steps: (a) heating the solvent in each chamber to dissolve the solid substances, (b) transferring the resulting solution in each chamber to the adjacent following chamber, (c) cooling the solution to precipitate a desired substance and (d) transferring the resulting mother liquor in each chamber to the adjacent prior chamber, and (3) taking out the desired substance with the solvent from the chamber positioned on the solvent feeding side and taking out the undesired substances with the solvent from the chamber positioned on the raw material feeding side.

2. The method of claim 1, wherein the solvent fed is a fresh solvent.

3. The method of claim 1, wherein the solvent fed is a mixture of a fresh solvent and the used solvent recovered from the chamber positioned on the solvent feeding side.

4. The method of claim 1, wherein the amount of the solvent fed is larger than the amount of the solvent taken out.

5. The method of claim 1, wherein the continuous multi-stage recrystallization consists of feeding the raw material from the top portion of the tower in an amount such that it is dissolved in the solvent in the top chamber, dissolving the solid in each chamber in the solvent by heating, transferring the resulting solution downwardly by one chamber while transferring the solution in the bottom chamber to a final crystallization tank, cooling the inside of the tower to precipitate crystals, and feeding during the cooling period to the bottom portion of the tower a selected amount of fresh solvent and an amount of the final mother liquor which is obtained from the final crystallization tank after the solution therein is cooled and the resulting crystals are separated as an end product, said mother liquor being fed in an amount equal to the volume of one chamber, whereby the mother liquor in each chamber is transferred upwardly without transfer of the crystals, while the mother liquor in the top chamber containing substances to be removed overflows from the top portion of the tower in an amount equal to the amount of fresh solvent added.

* * * * *